(12) United States Patent
Don et al.

(10) Patent No.: US 6,266,740 B1
(45) Date of Patent: Jul. 24, 2001

(54) DEVICE SEQUENCING AND PLACEMENT PROTECTION USING A DIGITAL SIGNATURE

(75) Inventors: Arieh Don, Brookline; Erez Ofer, Chestnut Hill; Natan Vishlitzky, Brookline, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/127,999

(22) Filed: Jul. 31, 1998

(51) Int. Cl.[7] .................................................. G06F 12/14
(52) U.S. Cl. .................................................... 711/114
(58) Field of Search .................................. 711/112, 114, 711/115, 156

(56) References Cited

U.S. PATENT DOCUMENTS

| | | | |
|---|---|---|---|
| 5,148,432 | * 9/1992 | Gordon et al. | 371/10.1 |
| 5,325,497 | 6/1994 | Jaffe et al. | 395/425 |
| 5,426,585 | * 6/1995 | Stepper et al. | 364/424.03 |
| 5,909,691 | * 6/1999 | Schulte et al. | 711/4 |

\* cited by examiner

*Primary Examiner*—Kevin L. Ellis
(74) *Attorney, Agent, or Firm*—George A. Herbster; Pearson & Pearson (57) ABSTRACT

A method and apparatus for verifying the organization of a magnetic disk storage system in which individual storage logical volumes are grouped in sequence as components of a meta device. Data concerning the organization of the meta device is stored in each storage logical volume in a dedicated storage area and in a global memory accessible to the data processing system. Whenever the integrity of the meta device is tested, the data in the configuration file and the data in the dedicated storage area are analyzed and compared. If identity exists, integrity is assumed. If identity does not exist various errors are generated to prevent use of the storage logical volume until the problem is resolved.

32 Claims, 9 Drawing Sheets

FIG. 9B

DEVICE SEQUENCING AND PLACEMENT PROTECTION USING A DIGITAL SIGNATURE

BACKGROUND OF THE INVENTION

1. Field of the Invention

This invention generally relates to data processing systems in which storage components must be maintained in a predetermined sequence. More particularly this invention relates to a data processing system in which a disk storage device is divided into a plurality of storage logical volumes and in which the storage logical volumes are concatenated in a sequence to produce a single host logical volume distributed over a plurality of magnetic disk storage drives.

2. Description of Related Art

Data processing systems generally comprise one or more processors, input-output units and data storage facilities. Data storage facilities comprise various types of memory including magnetic disk storage devices or drives. Multiple drives are often grouped into arrays, commonly referred to as disk array storage devices (DASD), that store applications and data as data sets, files or blocks in logical volumes as known in the art.

Prior art data processing systems, such as Symmetrix disk storage systems available from the assignee of this invention, define one of two possible relationships between logical volumes and physical disk drives. In one, a single logical volume exists on a single physical disk drive. In a second, a single physical disk drive may store a plurality of logical volumes. This type of storage is sometimes referred to as "hypered" storage, and the logical volumes are often called "hypers". However, in either approach, the capacity of a logical volume is limited to the maximum capacity of a physical disk drive on which the logical volume (i.e., "hyper") resides.

There are now emerging a number of applications where the required capacity for the logical volume, or hyper, exceeds the capacity of a physical disk drive. United States Letters Patent No. 6,055,603 granted Apr. 25, 2000 defines one approach for providing such increased capacity. In accordance with that solution a number of storage logical volumes are concatenated into a predetermined sequence as a meta device wherein each storage logical volume is a meta member. The first storage logical volume or meta member in the meta device is called a "meta head"; the last storage logical volume or meta member, a "meta tail". A meta device acts as a single host logical volume that a host addresses through the meta head. With this approach a host logical volume size becomes independent of physical drive capacity.

Meta devices require the position of the storage logical volumes or meta members including the meta head and meta tail and their corresponding drives to be fixed in sequence within a group. If, during a maintenance or upgrade procedure physical disk drives are removed and then accidentally exchanged when they are replaced, application data can be lost if that exchange goes undetected. This occurs because there is no way for the host processor to recognize that an exchange has occurred with respect to any meta member other than the meta head. The resultant potential for a data loss requires some approach to provide a data integrity check that assures correct placement of all the meta members in a meta device.

SUMMARY

Therefore it is an object of this invention to assign a unique identification to each logical volume.

It is another object of this invention to provide a method and apparatus by which each storage component or meta member of a meta device has a unique signature.

Still another object of this invention is to provide a method and apparatus for assuring the integrity of data in a meta device by monitoring the sequential placement of each logical volume in that meta device.

In accordance with this invention, testing of the sequential integrity of individual components in a magnetic disk storage system includes defining a dedicated storage area in each component that has a predetermined value in a signature field. A separate configuration file stores configuration data for each component, and this configuration data defines predetermined characteristics of the component. During testing, the predetermined value in the signature field from the dedicated storage area is analyzed and the configuration data common to the dedicated storage area and the configuration file are tested to confirm that the component possesses all the predetermined characteristics.

In accordance with another aspect of this invention, a data processing system includes a host processor and a magnetic disk storage system organized into storage logical volumes. Certain storage logical volumes are concatenated into a meta device that constitutes a host logical volume having a plurality of storage logical volumes distributed over a plurality of disk drives in the magnetic disk storage system. Testing to assure the integrity of the meta device includes defining a dedicated storage area in each storage logical volume when that volume is formatted. A configuration file in the storage system stores, for each storage logical volume in the storage system, configuration data that defines predetermined characteristics of each storage logical volume. Each storage logical volume in a meta device additionally includes a unique signature that is stored in its dedicated storage area. The unique signature comprises certain of the configuration data for the storage logical volume. During an integrity analysis, the signature in the dedicated storage area and the configuration data common to the dedicated storage area and the configuration file are analyzed to confirm that the storage logical volume possesses all characteristics corresponding to those in the configuration file.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
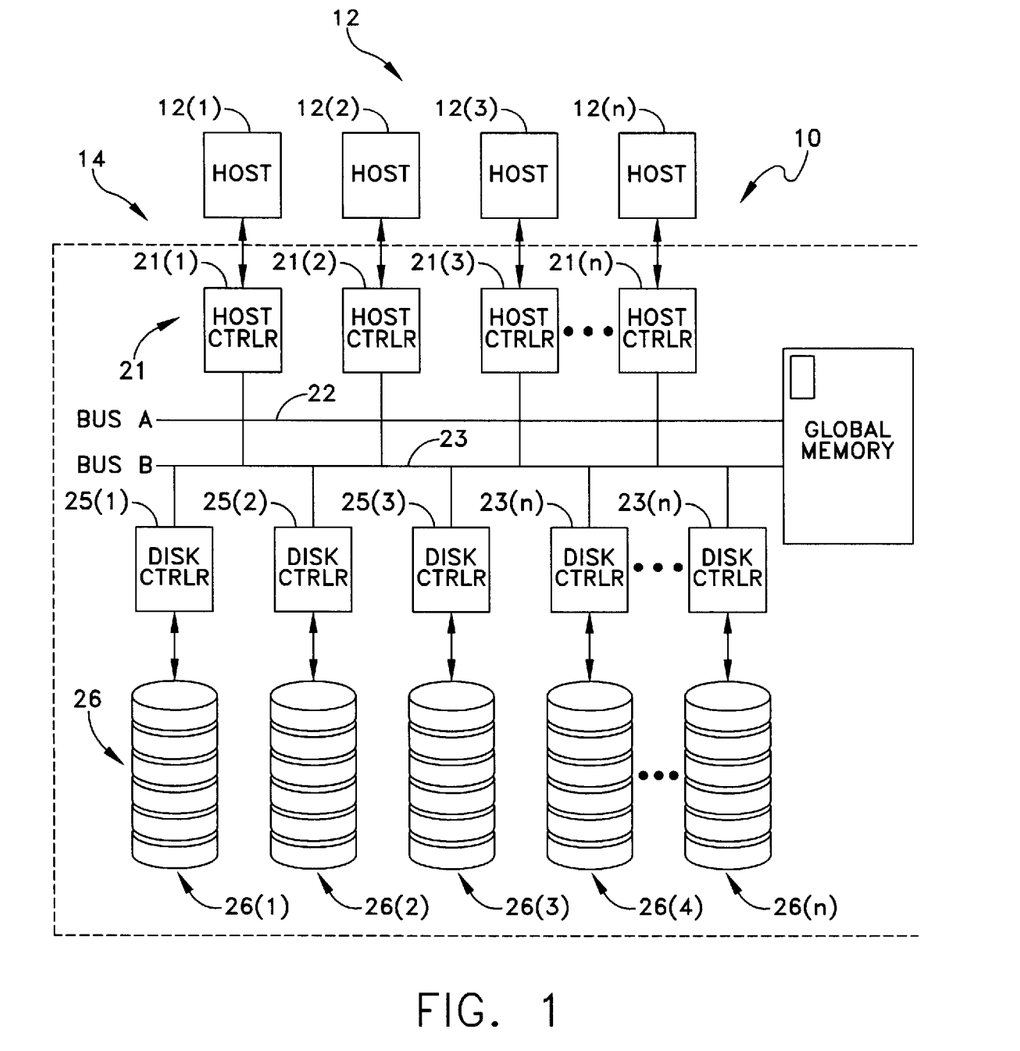
FIG. 1 is a diagrammatic representation of a storage system adapted for using this invention.

FIG. 1 depicts a data processing system 10 with a plurality of hosts 12 designated individually as hosts 12(1) . . . 12(n)

that connect to a magnetic disk storage system 14. The storage system 14 includes a plurality of host controllers 21 individually designated 21(1) . . . 21(n) which are coupled alternately to buses 22 and 23. Each of the host controllers 21(1) through 21(n) is responsible for managing the communications between any of its associated attached host computers 12 and the storage system 14. These host controllers generally will include one or more central processing units that operate under program control to manage the flow of data between an associated host computer and the storage system 14.

Also coupled alternately to buses 22 and 23 are a plurality of disk controllers 25(1) . . . 25(n). Disk controllers 25(1) . . . 25(n) can be similar in construction to host controllers 21(1) . . . 21(n). That is, each disk controller includes at least one central processing unit that operates under program control. Each of the disk controllers 25(1) . . . 25(n) connects to an array 26 of storage devices, which as shown here may be magnetic disk storage devices 26(1) . . . 26(n). Like the host controllers 21 described above, each of the disk controllers 25(1) . . . 25(n) is responsible for managing the communications between its associated array of disk drives and the host controllers or cache memory in a global, or cache, memory 24 included with the storage system 14.

As previously indicated, traditionally a physical disk drive may store a single logical volume or if a hypered device, multiple logical volumes, or hypers. The meta device eliminates these constraints as to size because it appears to a host as a single logical volume even though its data may be stored on multiple logical volumes spread across multiple disk drives. Consequently, in the following discussion a "storage logical volume" is a single hyper that may correspond to all or only a portion of available storage space in a physical disk drive. A host logical volume may correspond either to a single storage logical volume or, in the case of a meta device, to multiple concatenated storage logical volumes.

More specifically, FIG. 1 depicts the array 26 of storage devices 26(1) . . . 26(n). Each storage device may comprise a single physical disk device with one or more storage logical volumes or multiple physical storage disk devices each with one or more storage logical volumes. Within the context of storage logical volumes, several storage logical volumes can be concatenated to form a single host storage volume as a meta device. Alternatively, each host logical volume may be constituted by a single storage logical volume. In the context of a meta device, a disk controller behaves exactly as it has in the past when a host logical volume was confined to a single storage logical volume. To accomplish this, the host controllers 21 of storage system 14 are enhanced to receive, decode, and distribute commands, address, and data associated with meta devices.

The global memory 24 is coupled to both buses 22 and 23. A portion of global memory 24 serves as a very large cache. The cache is used as a staging area during the transfer of data between the host computers 12 and the storage devices, or disk arrays, 26.

Figure 2:
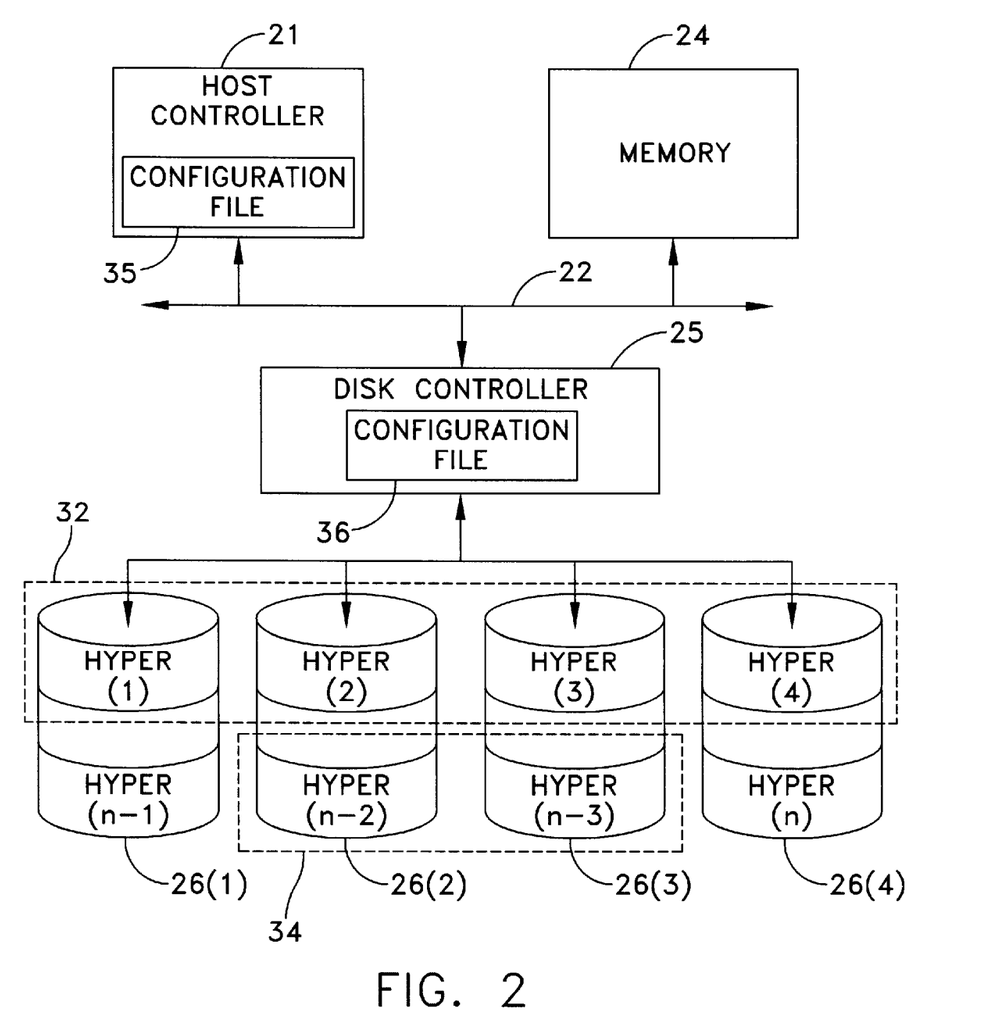
FIG. 2 is a block diagram of a portion of the data storage system of FIG.1.

FIG. 2 depicts a magnetic disk storage system with four hypered disk drives 26(1) through 26(4). Actual systems will include up to a hundred physical drives or more. Moreover, replacement packages containing physical disk drives tend to have an identical or nearly identical appearance. Consequently it is quite easy to swap physical disk drives inadvertently unless an individual is very careful in marking each physical disk drive when it is removed from the system. From FIG. 2 it will be apparent that inadvertently swapping physical disk drives 26(2) and 26(3) would reverse the order of concatenation for the storage location volumes or meta device components for the meta device 32 to HYPER(1)–HYPER(3)–HYPER(2)–HYPER(4) and, for the meta device 34, to HYPER(n–1)–HYPER(n–2).

More specifically, the host would determine that the swap in the meta device 34 had occurred with respect to the meta device 34 because the HYPER(n–2) storage logical volume, which is the meta head, would have been swapped with the meta tail that does not contain data that the meta head contains. As the host communicates with only the meta head, it would detect the fact that it was no longer communicating with the meta head.

However, that same exchange would effect only HYPER-2 and HYPER-3 meta elements in the meta device 32. The HYPER-1 head would not be affected, so the host would not detect any change. Such an inadvertent swap therefore would place the data integrity of meta device 32 in jeopardy of being corrupted.

FIG. 2 also depicts configuration files 35 and 36 located in the host controller 21 and disk controller 36 that are identical. The configuration file in host controller, such as the configuration file 35, contains certain characteristics of each storage logical volume which it represents to the host. Likewise, the configuration file in a disk controller, such as the configuration file 36 in the disk controller 25, contains the same information about each storage logical volume with which it communicates.

Figure 3:
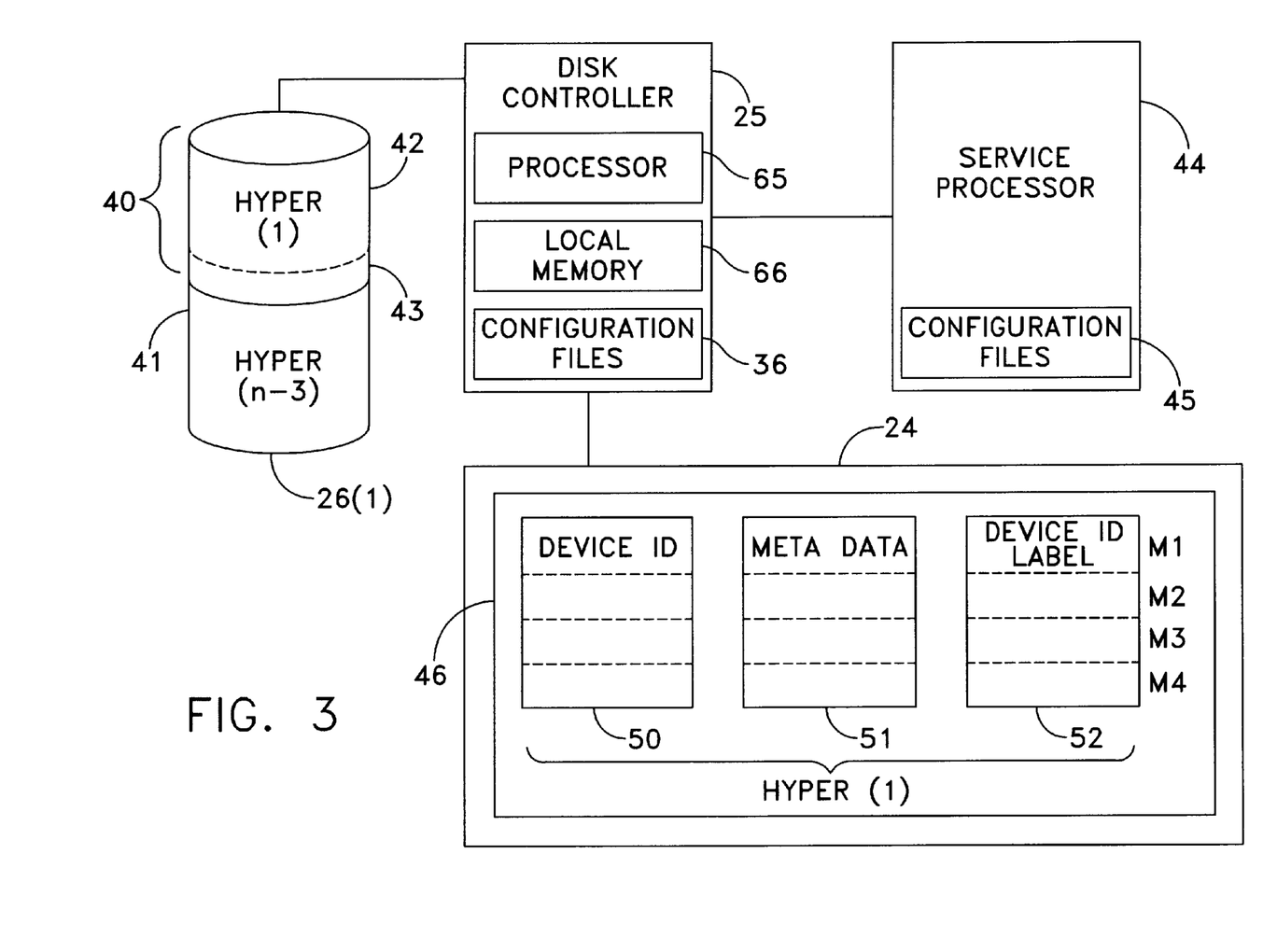
FIG. 3 is a block diagram of a portion of the data storage system shown in FIG. 2.

FIG. 3 depicts a portion of the data processing system shown in FIGS. 1 and 2, particularly the global memory 24, the disk controller 25 and the physical disk 26(1) that is useful in understanding how this invention protects against incorrect placement by use of a digital signature that is unique to each storage logical volume. Specifically, FIG. 3 depicts the physical disk 26(1) with its HYPER(1) storage logical volume 40 and HYPER(n–3) storage logical volume 41. In this embodiment the HYPER(l) storage logical volume 40 is a component of the meta device 32; the HYPER (n–3) storage logical volume 41 is a stand alone or single-hyper logical volume.

In accordance with this invention each storage logical volume has a main data storage area and a dedicated storage area. As shown in FIG. 3, the HYPER(1) storage logical volume has a main storage area 42 and a dedicated storage area 43. Each dedicated storage device stores data pertinent to the operation of the storage device. Host applications are prevented from accessing this dedicated area. In a device available from the assignee of this invention, each logical volume has a storage area designated as a "Customer Engineering" or "CE" storage area, such as the storage area 43 shown with respect to the storage logical volume 40.

FIG. 3 also depicts the addition of a service processor 44 that communicates with all disk controllers in the system. The service processor 44 also includes configuration files 45 for each storage logical volume that, like the other configuration files, stores data defining the same various characteristics about each individual storage logical volume that the other configuration files contain.

A portion 46 of the global memory 24 will normally contain a number of tables or structures for each storage logical volume. Tables for the HYPER(1) storage logical volume 42 are depicted as including a device ID data structure 50, a meta data structure 51, and a device ID label data structure 52.

Such disk storage systems can also include a mirroring function whereby an exact copy of one logical volume is stored on one to three other logical volumes, normally associated with different disk controllers. The primary storage logical volume is also designated as an M1 mirror device with the others being the M2, M3 and M4 mirroring devices. The data structures 50, 51 and 52 are subdivided into four mirror sections M1, M2, M3, and M4. Consequently the information in these data structures reflects information stored in the dedicated storage area 43 for the corresponding storage logical volume and each mirror of that storage logical volume.

Figure 4:
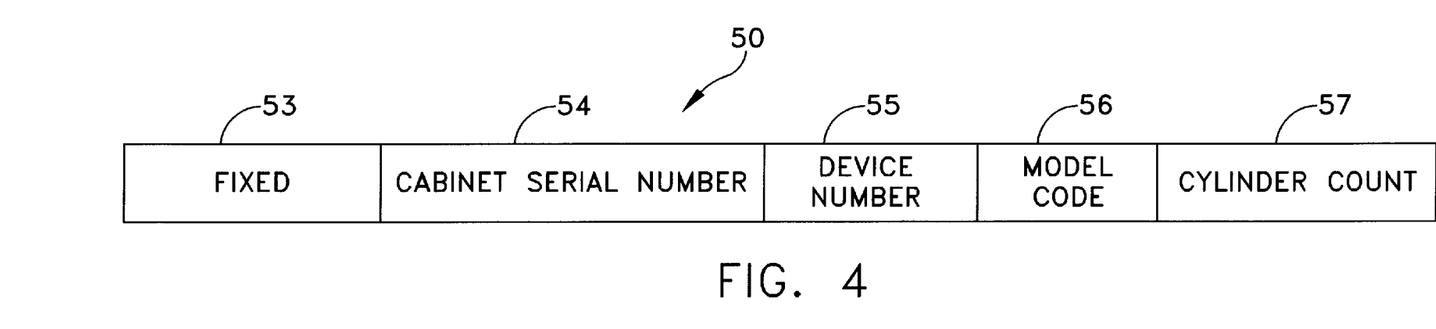
FIGS. 4 through 6 depict data structures incorporated in the system depicted in FIG. 3.

FIG. 4 depicts the device ID structure 50 for an individual storage logical volume, such as the HYPER(1) storage logical volume 40. A first field 53 has a fixed or constant value comprising a fixed number of bytes. This is a standard constant value assigned to each manufacturer by the IEEE. The remaining fields, however, are available to the manufacturer. For implementing this invention field 54 includes a cabinet serial number identification that identifies a physical cabinet in which the storage logical volume was found when formatted. A device number in field 55 constitutes a unique number assigned to each storage logical volume. Field 56 defines a model code; field 57 defines a total number of cylinders available in that particular storage logical volume.

Figure 5:
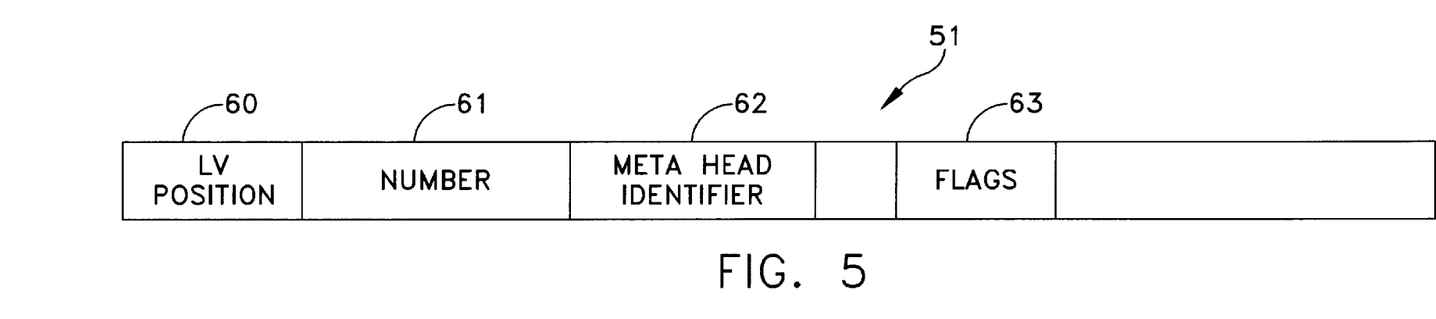

FIG. 5 depicts the detail of the meta data structure 51 for an individual storage logical volume. Field 60 contains a logical volume position; that is, the position within the meta group. Field 61 identifies the number of storage logical volumes comprising the meta device. Field 62 provides the device number of the meta head; that is, the contents of the device number field 55 in the device ID data structure assigned to a storage logical volume that serves as the meta head. Meta device flags in field 63 indicate whether the storage logical volume is a meta device and if so whether it is a meta head, a meta tail or a meta member.

Figure 6:
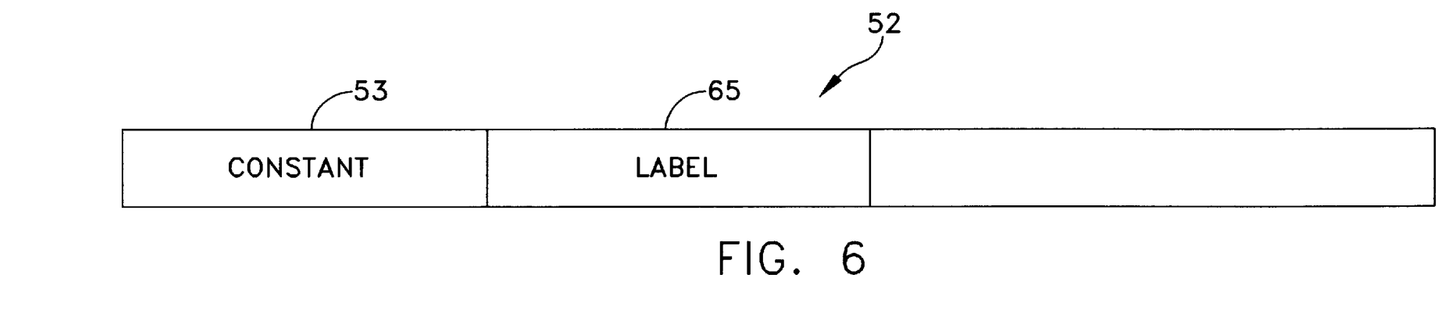

FIG. 6 depicts the data structure for an individual entry in the device ID label data structure 52. In essence this includes a constant in field 64 and a label in field 65 that is applied to the storage logical volume during configuration.

Figure 7A:
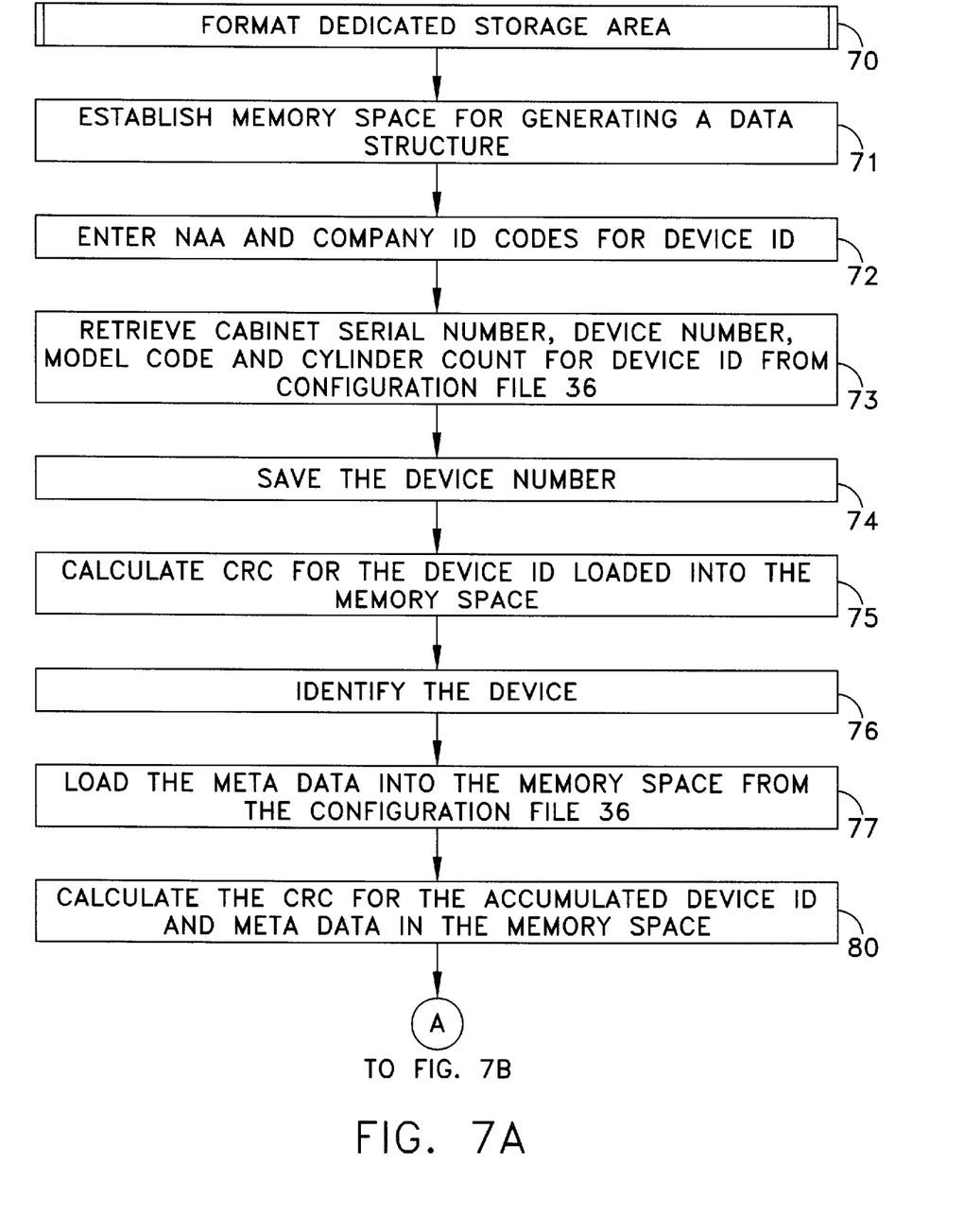
FIGS. 7 and 7A depict a formatting module for implementing this invention.
Figure 7B:
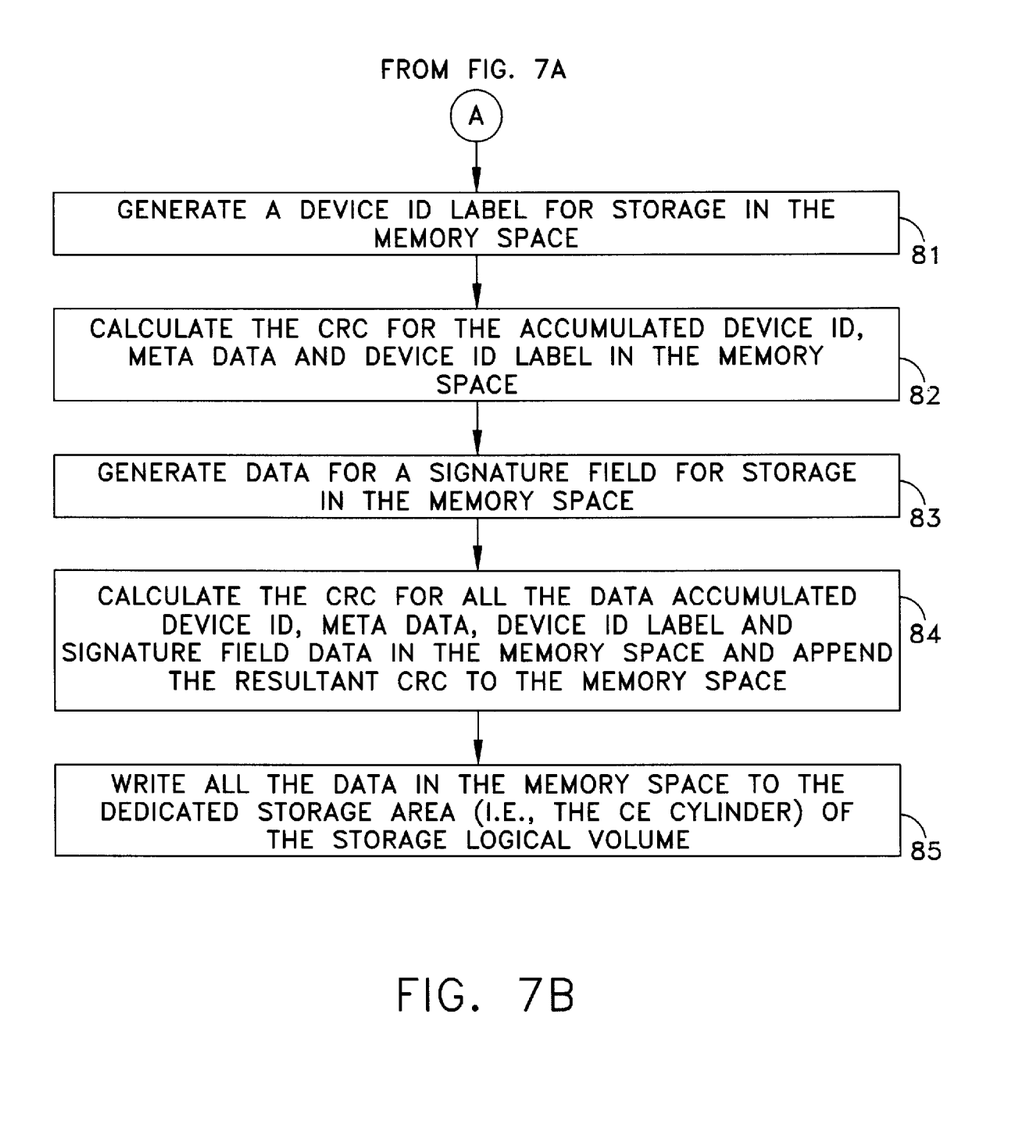

Referring again to FIG. 3, the disk controller 25 comprises a dedicated processor 65 and a local or scratch-pad memory 66 accessed by the processor 65. FIGS. 7A and 7B depict the steps by which the processor 65 formats the CE cylinder that constitutes one embodiment of a dedicated storage area 43 in the storage logical volume 40 of FIG. 3. This process occurs during a VTOC formatting process in the magnetic disk storage systems that assignee provides.

When a storage logical volume is to be formatted, the formatting module 70 uses step 71 to establish a memory space within the local memory 66 for generating a data structure. Step 72 produces the values for the NAA and company ID codes for the device ID. Generally these constants will be provided directly by microcode controlling the processor 65. Step 73 retrieves the cabinet serial number, device number, model code and cylinder count from the configuration file 36 in the disk controller 25. Step 74 saves the device number in the field 62 in the local memory 66 and in the global memory 24. After this information is assembled by the processor, the device ID data structure 50, that has the structure shown by FIG. 4, is loaded into the assigned memory space for the data structure. Step 75 calculates a CRC for the device ID data as it is loaded into the memory space. This code is an intermediate CRC that is altered in subsequent steps.

With this information the initialization module 70 uses step 76 to retrieve from the configuration file 36 corresponding meta data for the device number saved in step 74. Step 80 augments the CRC calculated in step 75, by further calculating the CRC for the accumulated device ID and meta data. In step 81 of FIG. 7B, the formatting module generates a label for storage in the memory space. This label has the data structure shown in FIG. 6. Step 82 updates the CRC. In step 83 the formatting module 70 generates data for a signature field. This can be a fixed or predetermined digital signature. For example, the data in the signature field is "ABCDEFGH" in one embodiment. In step 84 the formatting module completes the CRC calculation. When all of this has been completed, step 85 writes the data structure including the CRC into the memory space to the dedicated, or CE, storage area in the corresponding storage logical volume, such as in the dedicated storage area 43 for the HYPER(1) storage logical volume 40.

Figure 8:
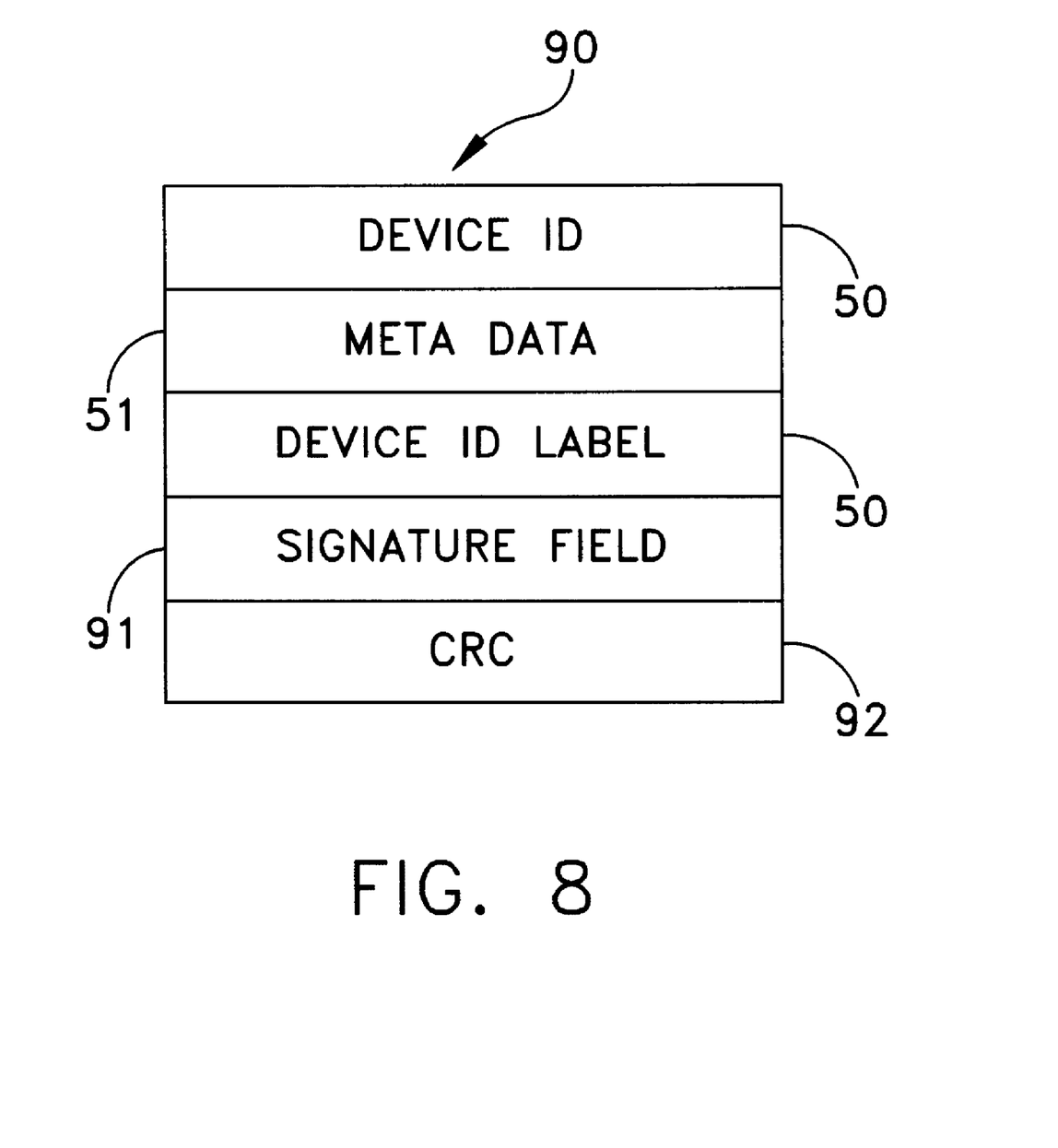
FIG. 8 depicts a data structure generated in response to the operation of the module shown in FIGS. 7A and 7B.

When the process in FIGS. 7A and 7B completes, the dedicated storage area 43 contains a block 90 of data, generally as shown in FIG. 8. Specifically this block 90 includes the device ID 50 shown in detail in FIG. 4, the meta data 51 shown in FIG. 5, and the device ID label 52 shown in FIG. 6. In addition the data structure 90 includes the signature field 91 and appended the CRC 92. Stated differently, each storage logical volume contains in the dedicated storage area 43 a number of fields that collectively define a unique signature for that storage logical volume and that includes certain of the configuration data for the storage logical volume.

Figure 9A:
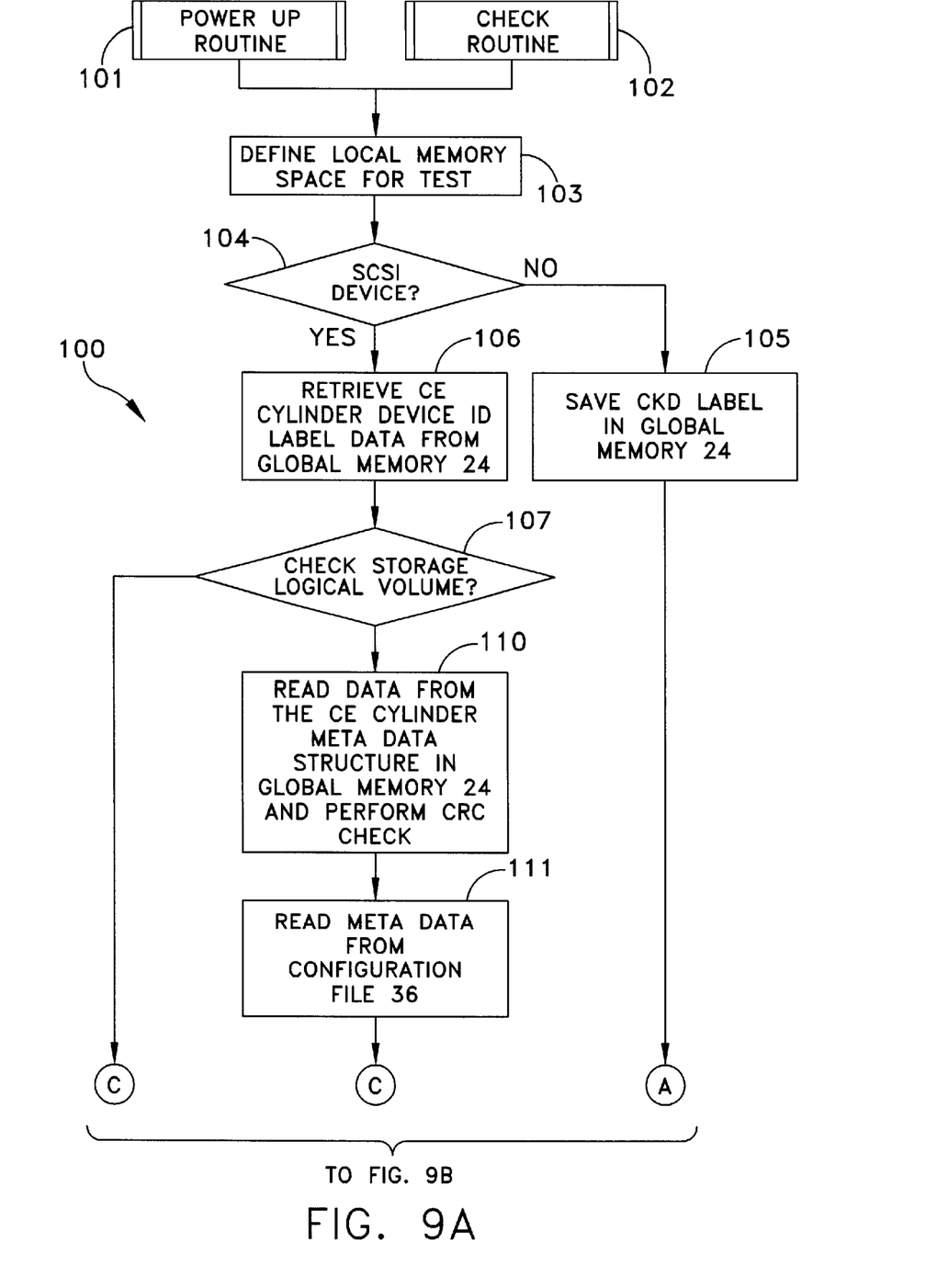
FIGS. 9A and 9B depicts the operation of a integrity checking module useful in accordance with this invention.
Figure 9B:
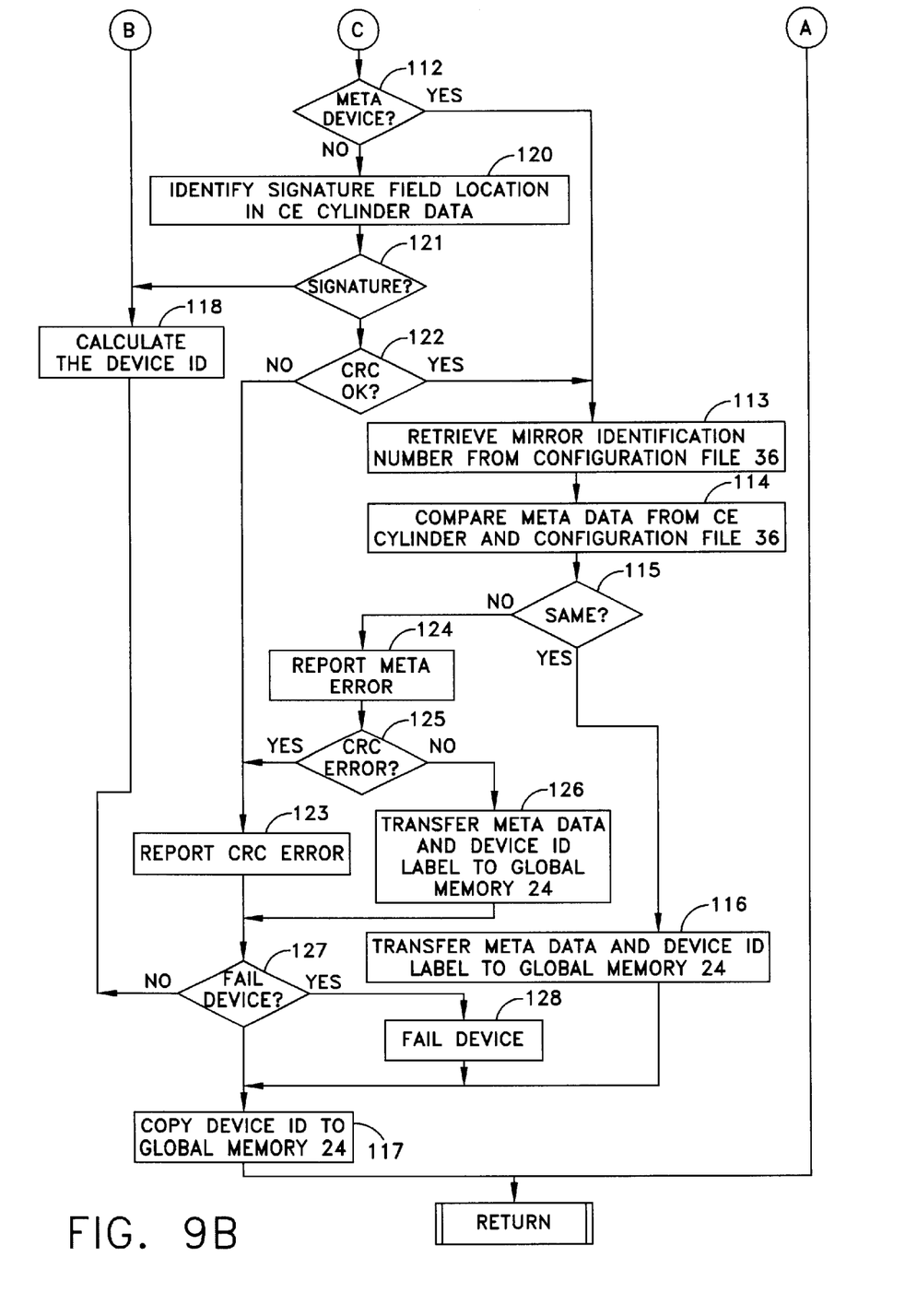

After this process is complete, another method, that is similar to a portion of the module of FIGS. 9A and 9B transfers a copy of the device ID, meta data and device ID label data structures 50, 51 and 52 to the memory portion 46 in the global memory 24. Maintaining a copy of each set of data structures for each storage logical volume each of these locations makes all of this information readily and directly accessible to any unit in the magnetic disk storage system. As described later, if it is determined that a particular storage logical volume is not available for use, a host controller attempting to process a request will not receive bad data.

FIGS. 9A and 9B depict an analyzing module 100 that resides in each disk controller and that is invoked at various times. For example, after the VTOC operation in FIGS. 7A and 7B has been completed, the magnetic data storage system may be "powered up" or initialized. At other times a system operator may wish to test the integrity of the system. Under the first situation, a "power up" routine 101 shown in FIG. 9A starts the analysis module 100; under the second situation the operator initiates a "check routine" module 102 that calls the module 100.

Step 104 determines whether this logical volume is on a SCSI device. Magnetic disk storage devices are generally categorized by particular protocols. Two such protocols are SCSI and CKD protocols. If a storage logical volume operates according to the CKD protocol, control transfers to step 105 that saves a corresponding CKD label in a location in the global memory 24 as known in the prior art. The module 100 then terminates its operation because no further action is needed.

However, when the storage logical volume operates as a SCSI device, step 104 shifts control to step 106 to transfer the CE cylinder device ID, meta and label data from a scratch area in global memory to a scratch area in local memory, such as local memory 66.

In step 107 of FIG. 9A the module 100 determines whether it is even necessary to test this particular device. For example, one magnetic disk storage system sold by the assignee of this invention provides a geographically remote mirroring operation. Each of the storage logical volumes in the geographically remote device are also identified in the records in the controller 21 and in the data structures of the global memory 24. As will be apparent, it would not be necessary to test the correct position of such a remotely located device under any of the conditions that would normally require the remainder of the module 100 to be processed.

Assuming that the device is to be checked, control transfers from step 107 to step 110 wherein the module 100 reads data for a "CE cylinder meta data" structure from a scratch portion of the global memory 24 and calculates a CRC on that data. The data in the corresponding meta data structure 36 in the configuration file 36 is read in step 111.

If the information from the configuration file 36 indicates that the storage logical volume is a component in a meta device, step 112 in FIG. 9B transfers control to step 113 that retrieves a mirror identification number from the configuration file. As depicted in FIG. 3, the meta data, the device ID and device ID label structures 50, 51 and 52 contain blocks for each of the mirrors. The mirror identification establishes an addressing offset so that any data is transferred into the global portion 46 of the global memory 24 at an appropriate mirror location.

As the storage logical volume being tested is a meta device, the data in the meta data structures from the dedicated storage area 43 and the configuration file 36 will be the same. Step 114 compares the meta data from the dedicated storage area 43 and the configuration file 36. If it is the same, step 115 transfers control to step 116 that transfers the meta data and device ID label to corresponding data structures in the global memory 24, such as the data structures 51 and 52 for the appropriate mirror of the HYPER(0) storage logical volume 40. Then control transfers to step 117 to copy the device ID into a dedicated location.

As previously indicated, upon completion of the VTOC formatting process shown in FIGS. 7A and 7B the data structures in the dedicated storage area are copied to the global memory 24. The process in FIG. 9B can provide that function. That is, for each meta device that is detected, the system transfers the device ID, meta data, device ID label to the global memory 24 into appropriate positions as determined by the mirror number offset. For example, if the data pertains to an M2 mirror, that data transfers to the M2 position in the data structures 50, 51 and 52.

Referring back to FIG. 9A, if the device is not to be checked, step 107 transfers control to step 118 in FIG. 9B whereupon the system calculates the device ID from the data in the configuration file 36 and stores it in global memory 24 using step 117.

When a storage logical volume is not a component of a meta device, step 112 transfers control to step 120 that identifies the physical location of the signature field 91 (FIG. 8) within the dedicated storage area. If a predetermined signature field value, such as the "ABCDEFGH", does not exist in that field, step 121 transfers control to step 118 to calculate the device ID for transfer to global memory 24 in step 117.

If the signature is detected, step 121 transfers control to step 122 that tests the CRC data for the entire dedicated storage area 43. If this test is passed, it is assumed that the data is correct and control transfers to step 113. Otherwise a CRC error exists, and control passes to step 123 that reports the CRC error, generally by generating a particular error report and by shifting the data in the meta data and device ID label structures to a predetermined value, such as −1. Any time a user tries access the meta device with an address to the particular storage logical volume, the −1 or other value the global memory 24 indicates that a problem exists.

If the meta data from the CE cylinder 43 and configuration files 36 do not compare, step 115 transfers control to step 124 to generate a meta error report indicating that the two data items are not the same. Then control passes to step 125 to determine if a CRC error exists. If a CRC error exists, step 125 transfers control to step 123 to report the CRC error. Otherwise control transfers to step 126 transfer the meta data and device ID label to the global memory 24.

When either a CRC error is reported in step 123 or the transfer of step 126 has been completed, control transfers to step 127 to determine whether the device should be indicated as a "failed" device. If it should not be failed, control merely passes to step 117. If it is determined that the device needs to be failed, step 128 invokes a failure routine that sets an appropriate value to a readiness flag. Then the device ID with its −1 value is transferred to global memory by step 117.

When these operations have been completed, the data in the configuration file 36, the dedicated storage area 43 and the corresponding structures 50, 51 and 52 all reflect significant characteristics of the storage logical volume 42. Should an individual reverse the positions of two devices, place a new device that has not been properly formatted into the system or perform some other similar operation, the process of FIGS. 9A and 9B will be run prior to placing the devices back on line. This analysis will recognize any disparity in the meta data and produce an appropriate error result therefore quickly notifying personnel that a problem exists. As this process of FIGS. 9A and 9B operates prior to any access to a storage logical volume by any application program, such application programs can not corrupt the data or receive bad data that may otherwise exist on a misplaced unit.

Thus, there has been disclosed a system for assuring that the sequence of storage logical volumes in a meta device is maintained. This is achieved by defining a dedicated storage area 43 in each storage logical volume. Configuration files 36, as shown in FIG. 3, store configuration data for each logical volume. This information defines predetermined characteristics of the drive such as its physical location within a system, the number of cylinders, model and related information. The dedicated storage area additionally includes a unique signature, such as the signature 90 shown in FIG. 8 that includes a signature field 91, and certain of the configuration data from the configuration file 36.

When it is necessary to test a system, the contents of the signature field are analyzed by comparing the portions of the unique signature in the dedicated storage area to the configuration data to confirm that this storage logical volume or mirror possesses all the predetermined characteristics. When a mismatch occurs, the system readily identifies the particular unit by means of the device ID data structure, such as the device ID data structure 50 in FIGS. 3 and 4. Thus the block 90 in FIG. 8 collectively constitutes a unique identification for each storage logical volume within an entire data storage facility. Moreover, when storage logical volumes are combined in a meta device, each storage unit has a unique signature within the meta device. As described, this unique signature provides positive information that is readily analyzed to assure the integrity of the meta device by detecting, prior to access to the data, any error in the placement of physical disk drives when the sequence of placement is critical. Stated differently, the successful analysis of the unique signature is a condition precedent to access data on the meta device.

This invention has been described above in specific terms related to a particular magnetic data storage system such as Symmetrix 5000 available from the assignee of this invention. It should be apparent, however, that many variations could be made to the specific enclosed embodiment. For example, the specific procedure set forth in FIGS. 7A, 7B, 9A and 9B are illustrative of one embodiment. The nature of the steps and sequencing of various individual steps in those modules could be altered. Likewise particular data structures have been disclosed. These structures also can be varied. Therefore, it is the intent of the appended claims to cover all such variations and modifications as come within the true spirit and scope of this invention.

What is claimed as new and desired to be secured by Letters Patent of the United States is:

1. A method for testing the sequential integrity of individual logical volumes organized in a sequential group of logical volumes in a magnetic disk storage system comprising the steps of:
    A) defining a dedicated storage area in each logical volume,
    B) defining a configuration file for storing configuration data for each logical volume that defines predetermined characteristics of each logical volume that includes a field that states whether a logical volume is in the group and additional data concerning first characteristics of the logical volume in that group,
    C) storing a unique signature in the dedicated storage area for each logical volume wherein the unique signature includes characteristics corresponding to the first characteristics, and
    D) analyzing, for a selected logical volume, the signature in the dedicated storage area and the first characteristics of the configuration data common to the dedicated storage area and the configuration file to confirm that the logical volume possesses all the first characteristics forth in the configuration file as a condition precedent for access to the data in the organized group of logical volumes.

2. A method as recited in claim 1 wherein said analyzing step includes the step of comparing the first characteristics from the dedicated storage area and from the configuration file when the configuration file indicates that the logical volume is in a group.

3. A method as recited in claim 2 wherein the configuration data in the dedicated storage area includes a predetermined value in a signature field, said analyzing step including the steps of testing the contents of the signature field for the predetermined value when the configuration file indicates that the logical volume is not in the group and, in response to the test, taking one of the steps of terminating the test for the logical volume and comparing the first characteristics of signature from the dedicated storage and from the configuration file.

4. A method as recited in claim 3 wherein in response to a failure of the test said analyzing step reports a failed device status for the sequential group of logical volumes and the logical volume.

5. A method as recited in claim 3 wherein the configuration data includes a device identification for each logical volume and said step of storing the unique signature includes storing the device identification.

6. A method as recited in claim 5 wherein the configuration data includes a device label for each logical volume and said step of storing the unique signature includes storing the device label.

7. A method as recited in claim 6 wherein said storing of the unique signature includes storing a calculated redundancy code for the combination of the device identification, characteristics, device label and signature field and the retrieval of said unique signature includes checking the redundancy code for the retrieved information.

8. A method as recited in claim 7 additionally comprising the step of terminating said analyzing step when a redundancy code error is detected.

9. A method for testing the integrity of a meta device comprising a plurality of storage logical volumes distributed over a plurality of disk drives, said method comprising the steps of:
    A) upon formatting of each storage logical volume, defining a dedicated storage area therein on the corresponding disk drive,
    B) defining a configuration file for storing configuration data for each storage logical volume that defines predetermined characteristics of that storage logical volume,
    C) storing a unique signature in the dedicated storage area of each storage logical volume on the disk drive wherein the unique signature comprises certain of the configuration data for the storage logical volume, and
    D) analyzing, for a selected storage logical volume and as a condition precedent to access to data stored in the meta device, the signature in the dedicated storage area and the configuration data common to the dedicated storage area and the configuration file to confirm that the storage logical volume possesses all characteristics forth in the configuration file.

10. A method as recited in claim 9 wherein the configuration file includes a field that states whether a storage logical volume is in a meta device and additional data concerning first characteristics of the storage logical volume in that group and the unique signature includes corresponding characteristics of the logical volume, said analyzing step including the step of comparing the first characteristics from the dedicated storage area and from the configuration file when the configuration file indicates that the logical volume is in a meta device.

11. A method as recited in claim 10 wherein the configuration data in the dedicated storage area includes a predetermined value in a signature field and said analyzing step includes the steps of testing the contents of the signature field for the predetermined value when the configuration file indicates that the storage logical volume is not in a meta device and, in response to the test, taking one of the steps of terminating the test for the storage logical volume and of comparing the first characteristics of signature from the dedicated storage and from the configuration file.

12. A method as recited in claim 11 wherein in response to a failure of the test said analyzing step selectively establishes a failed device status for the storage logical volume and the meta device.

13. A method as recited in claim 11 wherein the configuration data includes a device identification for each storage logical volume and said step of storing the unique signature includes storing the device identification.

14. A method as recited in claim 13 wherein the configuration data includes a device label for each storage logical volume and said step of storing the unique signature includes storing the device label.

15. A method as recited in claim 14 wherein said storing of the unique signature includes calculating a redundancy code for the combination of the device identification, characteristics, device label and signature fields and the retrieval of said unique signature includes checking the redundancy code from for the retrieved information.

16. A method as recited in claim 15 additionally comprising the step of terminating said analyzing step when a redundancy code error is detected and transferring a predetermined error value to the configuration file in the memory.

17. Apparatus for testing the sequential integrity of individual logical volumes organized in a sequential group of logical volumes in a magnetic disk storage system comprising:

A) a dedicated storage area in each logical volume,

B) a configuration file for storing configuration data for each logical volume that defines predetermined characteristics of each logical volume and that includes a field that states whether a logical volume is in the group and additional data concerning first characteristics of the logical volume in that group, C) a unique signature in said dedicated storage area for each logical volume wherein the unique signature comprises certain of the configuration data for the logical volume including characteristics corresponding to the first characteristics, and D) means for analyzing, for a selected logical volume, the signature in said dedicated storage area and the first characteristics of the configuration data common to said dedicated storage area and said configuration file to confirm that the logical volume possesses all characteristics forth in said configuration file as a condition precedent for access to the data in the organized group of logical volumes.

18. Apparatus as recited in claim 17 wherein said analyzing means includes means for comparing the first characteristics from said dedicated storage area and from said configuration file when said configuration file indicates that the logical volume is in a group.

19. Apparatus as recited in claim 18 wherein the configuration data in said dedicated storage area includes a predetermined value in a signature field and wherein said analyzing means includes means for testing the contents of the signature field for the predetermined value when said configuration file indicates that the logical volume is not in the group and means responsive to the test for taking one of the steps of terminating the test for the logical volume and of comparing the first characteristics of signature from said dedicated storage and from said configuration file.

20. Apparatus as recited in claim 19 wherein said analyzing means includes means responsive to a failure of the test for reporting a failed device status for the sequential group of logical volumes and the logical volume.

21. Apparatus as recited in claim 19 wherein the configuration data includes a device identification for each logical volume stored with the unique signature.

22. Apparatus as recited in claim 21 wherein the configuration data includes a device label for each logical volume stored with the unique signature.

23. Apparatus as recited in claim 22 wherein said stored unique signature includes a calculated redundancy code for the combination of the device identification, characteristics, device label and signature field, said analyzing means including means for checking the redundancy code for the retrieved information.

24. Apparatus as recited in claim 23 additionally comprising means for terminating the operation of said analyzing means when a redundancy code error is detected.

25. Apparatus for testing the integrity of a meta device comprising a plurality of storage logical volumes distributed over a plurality of disk drives, said apparatus comprising:

A) a dedicated storage area in each storage logical volume on the corresponding disk drive, B) a configuration file for storing configuration data for each storage logical volume that defines predetermined characteristics of that storage logical volume, C) means for storing a unique signature in the dedicated storage area of each storage logical volume on the disk drive wherein the unique signature comprises certain of the configuration data for the storage logical volume, and D) means for analyzing, for a selected storage logical volume and as a condition precedent to access to data stored in the meta device, the signature in said dedicated storage area and said configuration data common to said dedicated storage area and the configuration file to confirm that the storage logical volume possesses all characteristics forth in said configuration file.

26. Apparatus as recited in claim 25 wherein said configuration file includes a field that states whether a storage logical volume is in a meta device and additional data concerning first characteristics of the storage logical volume in that group and the unique signature includes corresponding characteristics of the logical volume, said analyzing means including means for comparing the first characteristics from said dedicated storage area and from said configuration file when said configuration file indicates that the logical volume is in a meta device.

27. Apparatus as recited in claim 26 wherein the configuration data in said dedicated storage area includes a predetermined value in a signature field and said analyzing means includes the means for testing the contents of the signature field for the predetermined value when said configuration file indicates that the storage logical volume is not in a meta device and testing means responsive to the test for terminating the test for the storage logical volume or comparing the first characteristics of signature from said dedicated storage and from said configuration file.

28. Apparatus as recited in claim 27 wherein said analyzing means includes means responsive to a failure of said testing means for selectively establishing a failed device status for the storage logical volume and the meta device.

29. Apparatus as recited in claim 27 wherein the data in said configuration file includes a device identification for each storage logical volume stored with the unique signature.

30. Apparatus as recited in claim 29 wherein the data in said configuration file includes a device label for each storage logical volume stored with the unique signature.

31. Apparatus as recited in claim 30 additionally comprising means for calculating a redundancy code for the combination of the device identification, device label and signature fields and means for checking the redundancy code from for the retrieved information.

32. Apparatus as recited in claim 31 additionally comprising means for terminating the operation of said analyzing step when said redundancy code checking means generates an error and means for transferring a predetermined error value to said configuration file in the memory.

* * * * *